July 6, 1965 A. L. GORDAN 3,193,311
QUICK DISCONNECT, SELF-SEALING, HOSE COUPLINGS
HAVING IDENTICAL MATING PARTS
Filed Jan. 23, 1963
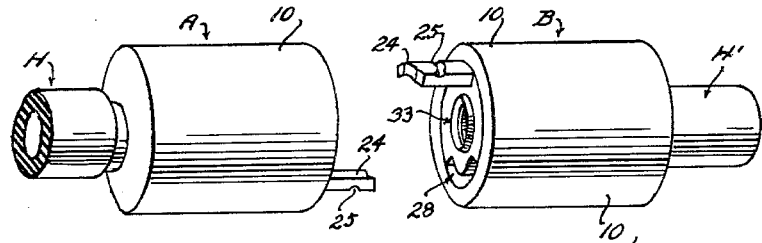
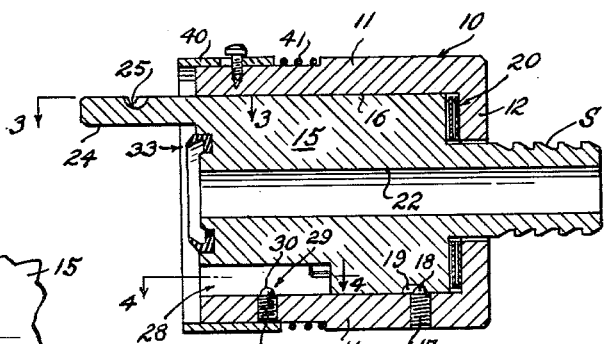
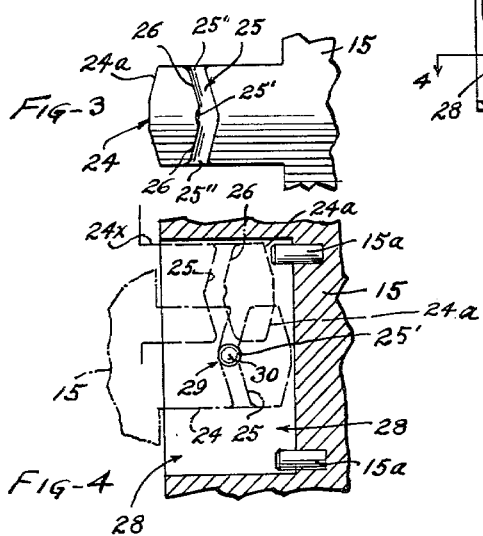
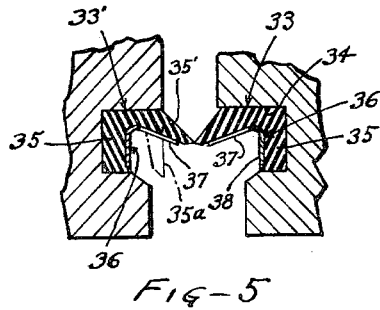
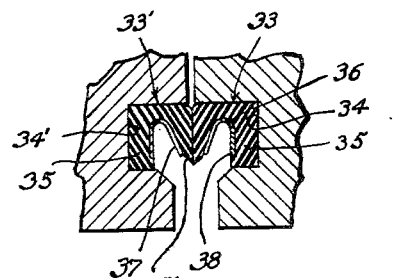
INVENTOR.
ANDREW L. GORDAN
BY George M. Soule
ATTORNEY 3,193,311
QUICK DISCONNECT, SELF-SEALING, HOSE COUPLINGS HAVING IDENTICAL MATING PARTS
Andrew L. Gordan, Cleveland, Ohio, assignor to Curtiss-Wright Corporation, a corporation of Delaware
Filed Jan. 23, 1963, Ser. No. 253,322
3 Claims. (Cl. 285—70)

This invention relates to couplings such as are used to transfer liquids and gases, e.g., from vehicle tank to vehicle tank or between storage tanks and vehicle tanks, particularly under pressures which become or tend to become critically high with desired increases in rate of delivery.

The embodiment of the present invention herein shown is adapted to be used in place of so called "quick disconnect" hose couplings commonly requiring a male fitting at one terminal and a female fitting at the cooperating terminal, so as to require matching of the fittings before connection can be effected. The operation of matching frequently wastes considerable time; and such waste can always be avoided by the use of the present coupling.

Objects of the present invention include provision of a coupling or set of couplings as outlined above capable of sustaining high fluid pressures; capable of being made in any desired size as from ¼ inch to 2 inches in diameter and with pressure sustaining capacities as high as 3,000 p.s.i.; wherein the manner of operation is not selective in direction as in the case of couplings having for example right hand threads; wherein the two coupling units or assemblies are self-locking in operating position but readily releasable without requiring special tools, and wherein all parts likely to be damaged are adequately protected thereagainst especially during operation to transfer fluids.

Objects and features of the invention not indicated above will become apparent from the following description of a preferred form as shown in the accompanying drawing. The essential characteristics are summarized in the appended claims.

In the drawings FIG. 1 is a small scale diagrammatic perspective view showing two identical couplings or coupling units in aligned position preparatory to being demountably locked together.

FIG. 2 is a longitudinal central sectional view in larger scale showing one of the couplings.

FIGS. 3 and 4 are somewhat diagrammatic detail views in the scale of FIG. 2, taken as indicated by lines 3—3 and 4—4 respectively thereon. FIG. 4 is a "development" view (circular to planar).

FIG. 5 is a further enlarged scale fragmentary sectional diagrammatic view of seal portions of two identical couplings prior to being brought into connecting or sealing position.

FIG. 6 is a view similar to FIG. 5 with the seal portions approximately in final sealing position.

Although identical the two couplings or coupling units are indicated A and B in FIG. 1. The description below is applicable to either coupling. The hose coupling sections H and H' FIG. 1 are assumed to be attached by conventional means not shown to relatively opposed end or spud portions (S, FIG. 2) of respective couplings.

The coupling unit as shown in FIGS. 2, 3 and 4 comprises a generally cylindrical cup shaped main body member 10 having a substantially continuous side wall portion 11 and a centrally apertured end wall 12. The end wall 12 receives the tubular spud portion S of a generally cylindrical coupling head member 15 slip-fitted into a bore 16 of the body 10 and approximately filling the cavity in the body defined by that bore.

The head member 15 as shown is secured approximately in fixed position in the bore 16 by a self locking screw 17 in wall 11. The screw 17 as shown has a ball-shaped end 18 entering a complementary radial socket 19 in the head member 15 such as will enable the latter to move axially a small distance rightwardly in the bore 16. When the ball end 18 of the screw is properly seated in the socket 19 a compression spring washer assembly 20 (e.g. wavy washer type) is under a predetermined degree of compression such as will initially resist movement of the head 15 toward the wall 12 with a predetermined force.

The head member 15 has an axial through bore 22 and, at diametrically opposite positions relative to the axis of the bore 22, an axial tongue or projection 24 of arcuate cross section constituting a coupling-locking cam having a radially outwardly exposed groove 25 providing a pair of cam faces 26 (see FIG. 3) and an axial socket 28 which is similarly of arcute transverse shape and of considerably greater circumferential extent than the width of the cam projection 24. The socket 28 is defined in part by the inner surface 16 of wall 11. Midway of the two sides of the socket 28, circumferentially of the coupling axis, the wall 11 of the body supports a suitable cam follower assembly 29 for selective engagement with the cam faces 26 of a co-acting coupling unit. The cam follower preferably comprises a ball 30 and a self-locking carrier screw 31 therefor in which the ball 30 is freely rotatable. In such case the cam groove 25 is of more or less rounded trough shape complementary to the ball 30 for the greater portion of its extent across the projection 24. As shown particularly in FIG. 3, the cam faces 26 are intersected by a shallow detent notch or depression 25' adapted to receive a portion of the follower element 30, see FIG. 4. The width or extent of the socket 28 circumferentially of the coupling is somewhat more than twice the width of the coacting cam-supporting projection or tongue 24 so that the projection can be easily inserted into the socket 28 at either side of the follower 30, which is more convenient or effectual from the standpoint of the operator.

When the two identical coupling members A and B are brought together, with the cam projections 24 received in selected sides of the respective sockets 28, the projections 24 of the couplings first occupy the position indicated in long dash lines at 24x in FIG. 4. In that position the projections can be positively blocked against further movement axially of the couplings by one of a pair of stops 15a, FIG. 4, in the sockets 28 engaging oblique end surfaces 24a of the projections 24 in positions such that the entrance portions of the cam grooves are aligned with the followers. After the followers enter the cam slots the movement of the coupler units A and B toward each other is yieldably resisted in part, by mutual endwise engagement of annular fluid sealing assemblies 33 and 33' of identical construction as shown best in FIG. 5.

In the just above mentioned relative position of the couplers A and B the follower elements 30 are in registration with throat or follower-receiving end portions 25" of the cam grooves 25 which may be oppositely flared or chamfered as suggested in FIG. 3. The couplers A and B are manually rotated or moved angularly in opposite directions and the couplers are forced axially towards each other via the influence of the selected cam faces 26 and the follower elements 30 until the latter are forced into the retaining notches or depressions 25', as shown by the dot-and-dash-illustrated position of a projection 24 in FIG. 4. The coupling operation usually requires compression of the spring assemblies 20 of each of the head members 15 followed by relaxing of the compressive force as the followers enter the detent notches 25'.

Referring to FIGS. 5 and 6 the seal assemblies 33 and 33' occupy suitable annular grooves 34 and 34' in the end faces of the head members 15 (e.g., pressed in or otherwise held firmly in place as necessary). The seal assemblies as shown in FIG. 5 comprise body portions 35 molded or formed from suitably tough elastic material (e.g. elastomer) of generally channel shaped cross section or as partially diagrammatically indicated at 35a left, FIG. 5—the showing at 25a indicating the position of the seal lip portion 35' in reference to the base or body portion 35 as molded. The body portions 35 of the seals are held in their mating grooves by fluid pressure action during operation to deliver fluid.

When the two couplings are in wholly disconnected position the lip portions 35' of the seals are deflected radially outwardly (see FIG. 5) by provision of suitable resilient metal spring members 36 having annular base portions 38 and generally frusto-conical rim or flange portions 37 suitably cut to provide spring fingers (not shown). The spring fingers permit flexure of the rim portions 37 toward the base portions 38. When the head members 15 and 15' of respective couplings are brought together and the cam followers 30 are nearly in position to be received into the retaining or detent notches 25' the coupling head members 15 and 15' occupy the relative position shown in FIG. 6 with the lip portions 35' of the seals in face-to-face contact with each other approximately as shown. When the followers are then received into the detent notches 25' the head portions are slightly separated (not illustrated) but the seals are nevertheless in sufficiently tight contact to block flow of fluid between them to a rather remarkable extent. Due to the fact that the original position of the seal lips is at 35a, FIG. 5, the seal lip portions are normally stretched and thereby substantially no wrinkling of the seal lip portions occurs when those portions are deflected into final working position as in FIG. 6.

Since the couplings A and B may remain in coupled position for substantial periods of time it is desirable that the effective annular groove around the couplers and between the relatively adjacent end faces of the head members 15 be closed outwardly around the seals 33 and 33' against reception of dirt or other foreign material. That can be accomplished for example by providing spring biased sleeves as at 40 (FIG. 2 only) around the body members 11 or in axially open grooves therein (not shown). The sleeves 40 are slid back against their biasing springs 41 when the coupling units A and B are brought together into final locking position.

To summarize the coupling operation, the person making the connection between the couplings A and B inserts the projections 24 into their coacting sockets 28 at whichever side of the plane of the followers 30 he finds most convenient from the standpoint of exerting the necessary torque. He then moves the two coupling units together as already described to bring about registration of the followers with the receiving throat portion 25'' of the cam grooves 25; then moves the body portions angularly about their respective axes in opposite directions (clockwise or counterclockwise as determined by the entering position of the projections 24), thus moving the followers into yieldably locked position in the notches or recesses 25' in which they are held by the spring action of the seals 33 and 33' as augmented by the compressive force of the spring washer assembly 20. The decoupling operation is simply the reverse of the operation just above described.

I claim:

1. As one member of a pair of identical coupling units for hose or the like, a body in the form of an open cup having an annular end wall portion and a side wall portion integral therewith, a tubular coupling head member approximately filling the interior of the body, said member having a portion extending through the said annular end wall for attachment to a hose or the like, and having an axially exposed face, an axial projection eccentrically of the head member rigid therewith, a cavity extending axially in the head member and eccentrically located diametrically of the projection and complemented by an interior surface of said side wall for receiving the cam projection of a cooperating coupling unit, a cam surface on the projection extending transversely thereof, a cam follower extending radially inwardly from the body side wall into said cavity for cooperation with such cam surface of the cooperating coupling unit, and an annular axially compressible seal around the axis of the said member and projecting from its axially exposed face.

2. The coupling construction according to claim 1 including a compression spring device disposed between said head member and said annular end wall of the body, retaining means detachably supported by the side wall of the body intersecting its cavity radially and an axially elongated socket in an external peripheral surface of the head member engaged by said retaining means and permitting axial movement of the head member in the body against the resistance of the compression spring.

3. The coupling construction according to claim 1 including axially facing stops in the cam-projection-receiving cavities positively resisting movement of the coupling units toward each other to assist in effecting operative alignment of the cam surfaces with coacting followers, and oblique end faces on the projections approximately parallel to associated cam faces for engagement with the stops.

References Cited by the Examiner

UNITED STATES PATENTS

| 489,107 | 1/93 | Storz | 285—352 |
|---------|------|-------|---------|
| 894,900 | 8/08 | Pohlman | 285—70 |
| 2,165,052 | 7/39 | Hering | 285—111 |

CARL W. TOMLIN, *Primary Examiner.*